United States Patent

Rathjen et al.

[15] 3,646,881
[45] Mar. 7, 1972

[54] MOLD COVER

[72] Inventors: Theodore Nicholas Rathjen, Oakland; Harold Biddick Hanson, San Leandro, both of Calif.

[73] Assignee: Chemetron Corporation, Chicago, Ill.

[22] Filed: Apr. 24, 1970

[21] Appl. No.: 31,668

[52] U.S. Cl. .......................99/351, 100/219, 100/DIG. 10
[51] Int. Cl. .........................................................A47j 27/20
[58] Field of Search ...............141/99, 263; 99/349, 350, 351; 100/DIG. 10, 219, 214, 258, 240, 245; 220/93

[56] References Cited

UNITED STATES PATENTS

| | | |
|---|---|---|
| 2,192,225 | 3/1940 | Gleason....................................99/351 |
| 3,580,165 | 6/1969 | Foldenauer..............................99/351 |
| 1,657,167 | 1/1928 | Lidseen et al............................99/351 |
| 1,835,628 | 12/1931 | Bellinghausen..........................99/351 |
| 2,105,941 | 1/1938 | Gleason....................................99/351 |
| 1,975,916 | 10/1934 | Bech.................................100/219 UX |
| 1,680,816 | 8/1928 | Spaulding.........................100/240 UX |
| 2,484,963 | 10/1949 | Samuel......................................99/351 |

*Primary Examiner*—Billy J. Wilhite
*Attorney*—Nicholas M. Esser

[57] ABSTRACT

In a mold cover for use in combination with an elongated open-ended mold, such as may be used in molding meat loaves and other food products, means are provided for maintaining a movable pressure plate in predetermined transverse relation to the sides of the mold as the plate is biased for movement longitudinally into the mold.

2 Claims, 4 Drawing Figures

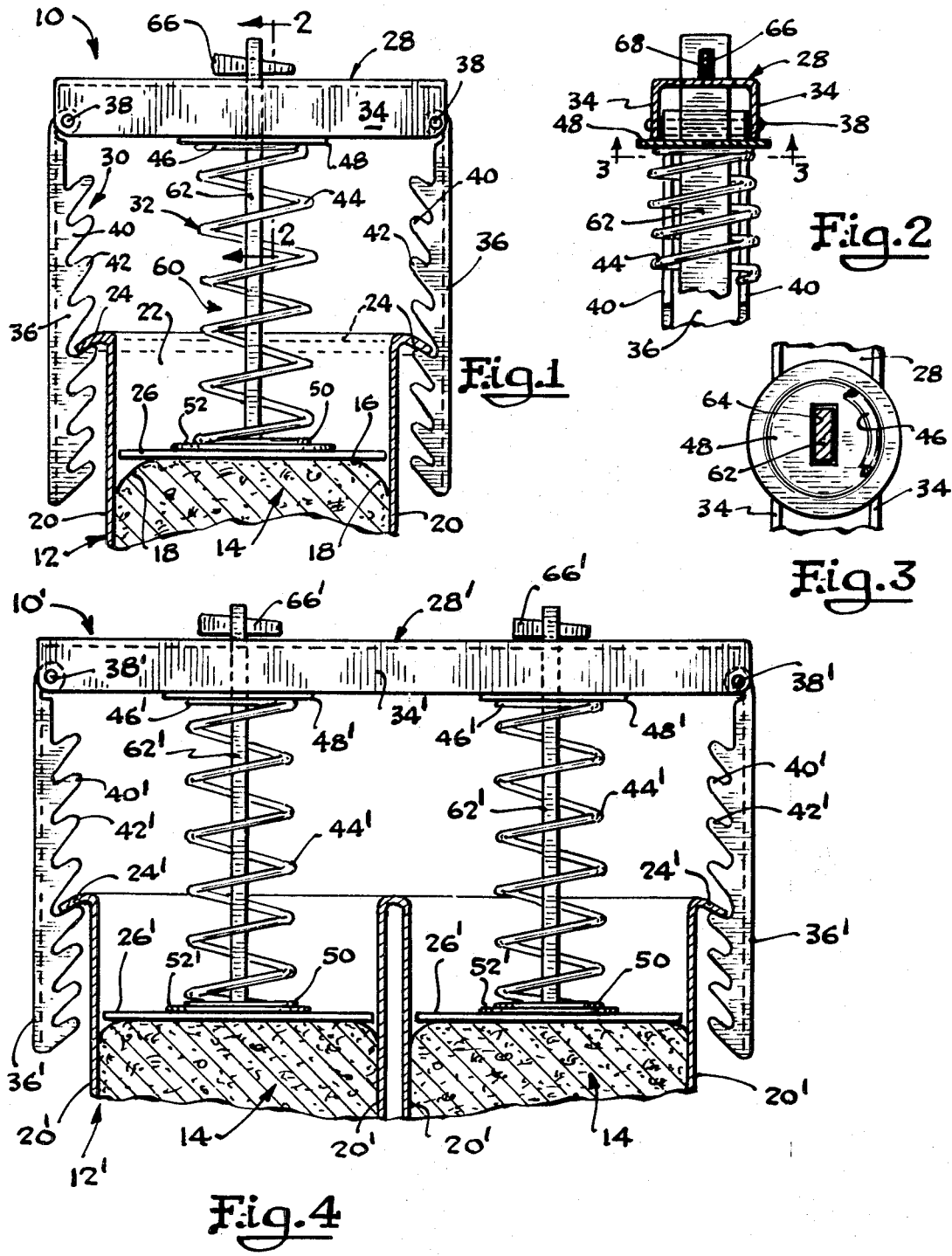

3,646,881

MOLD COVER

BACKGROUND OF THE INVENTION

This invention pertains generally to a mold cover for use in combination with an elongated open-ended mold, such as may be used in molding meat loaves and other food products, and more particularly to a mold cover designed to retain the shape of the adjacent end of a molded meat loaf or other molded food product during cooking, chilling, and other operations tending to cause distortion of the product.

Commonly, elongated open-ended molds are used in molding meat loaves and other food products, such as luncheon meats, coldcuts, etc., often in preparation for cooking, chilling, and other operations preliminary to slicing. Various processes and apparatus for filling molds of this type are described in U.S. Pat. Nos. 3,134,681, 3,237,662, 3,371,690, and 3,373,777. Conventionally, one end of the mold is closed during use, and the other normally open end of the mold is closed during cooking and chilling. In order to prevent pockets or bulges from forming in the finished products, it is desirable to hold the product firm during such expansion and contraction of the product as would occur during these operations. Preferably, the normally open end of the mold is closed by means of a cover designed to maintain pressure on the adjacent end of the product.

A type of cover widely used in one or another form to maintain positive pressure on the adjacent end of the product in an elongated open-ended mold is characterized by a pressure plate adapted to fit transversely within the mold for movement longitudinally of the mold and biased for movement longitudinally into the mold. In one such cover, as described in U.S. Pat. No. 3,166,007, the pressure plate is mounted to intersecting leaf springs. In other such covers, as known, the pressure plates are mounted to helical springs.

As appreciated by the applicants herein, a significant problem with most covers of the foregoing type results from the fact that the manner in which the pressure plate is mounted to one or more springs permits the plate to tilt with respect to the sides of the mold as the product expands or contracts during cooking or chilling or other operations tending to cause distortion of the product. Consequently, the end of the product adjacent the pressure plate often assumes a tapered or otherwise irregular shape permitting only incomplete slices to be removed in subsequent slicing operation. Usually, such incomplete slices are wasted.

In another such cover, as described in U.S. Pat. No. 3,017,822, telescoping members are mounted respectively to the pressure plate and to a cross head or frame secure to the open end of the mold. While the telescoping members do not permit the pressure plate to tilt with respect to the sides of the mold, the cover of the present invention accomplishes the result by a simplified and inexpensive means.

SUMMARY OF THE INVENTION

It is the principal object of this invention to provide an improved mold cover of the aforementioned type.

It is a more particular object of this invention to provide a simplified and inexpensive mold cover in which the pressure plate cannot tilt with respect to the sides of the mold.

The preceding objects may be attained in a mold cover comprising a plate adapted to fit transversely within the mold for movement longitudinally of the mold, means for biasing the plate for movement longitudinally into the mold, and means for maintaining the plate in predetermined transverse relation to the sides of the mold. Preferably, the mold cover further comprises a frame in combination with means for mounting the frame across the open end of the mold, and the means for maintaining the plate in predetermined transverse relation to the sides of the sides of the mold comprises an elongated bar rigidly mounted to the plate and guided for movement together with the plate longitudinally of the mold.

Accordingly, the plate cannot tilt with respect to the sides of the mold as the product expands or contracts during cooking or chilling or other operations tending to cause distortion of the product. Consequently, with most molded food products that tend to retain the shape of their confines, the aforementioned problems of the end of the product adjacent the plate assuming a tapered or otherwise irregular shape are substantially eliminated. Thus, the quantity of incomplete slices to be removed in subsequent slicing operations is substantially reduced.

These and other objects, features and advantages of this invention are evident from the following description, with the aid of the accompanying drawing, of a preferred embodiment of this invention.

BRIEF DESCRIPTION OF THE DRAWING

In the drawing:

FIG. 1 is a fragmentary sectional view of a nearly totally filled elongated open-ended mold in combination with a mold cover embodying the principles of this invention;

FIG. 2 is a sectional view taken substantially along line 2—2 of FIG. 1 in the direction of the arrows;

FIG. 3 is a sectional view taken substantially along line 3—3 of FIG. 2 in the direction of the arrows; and FIG. 4 is a fragmentary sectional view of a nearly totally filled elongated open-ended dual mold in combination with a dual mold cover also embodying the principles of this invention.

DESCRIPTION OF THE PREFERRED EMBODIMENT

In FIGS. 1 through 3, a mold cover 10 which constitutes a preferred embodiment of this invention, is shown in combination with a conventional single-cavity elongated open-ended mold 12, which is nearly totally filled with a meat loaf or other food product 14. As shown, the adjacent end 16 of the product 14, which has been shaped by suitable filling apparatus (not shown) is substantially flat, except at its immediate edges 18, and also is substantially normal with respect to the sides 20 of the mold 12. Such substantially squared shape of the end 16 of the product 14 minimizes the quantity of incomplete slices to be removed in subsequent slicing operations. The mold cover 10 is designed to substantially eliminate problems of the end 16 of the product 14 losing its substantially squared shape and assuming a tapered or otherwise irregular shape as the product 14 expands or contracts during cooking or chilling or other operations tending to cause distortion of the product 14. As shown, some space 22 normally is left unfilled in the mold 12 to permit expansion of the product 14.

In cross section, the mold 12 may be circular, oval, rectangular or square but for rounded corners, or otherwise arbitrarily shaped, as dictated by the desired shape of the product 14. The open end of the mold 12 is formed with an outwardly extended flange 24 either extended at right angles to the sides 20 of the mold 12 or preferably downturned (as shown). The opposite end (not shown) of the mold 12 may be assumed to be closed as by means of a plate disposed within the mold and engaged with an inwardly extended flange at the end of the mold 12.

The mold cover 10 is of the type characterized by a pressure plate 26 adapted to fit transversely within the mold 12 and biased for movement longitudinally into the mold 12. As in known covers, in order to hold the product 14 firm during expansion and contraction, the plate 26 maintains positive pressure on the adjacent end 16 of the product 14. As shown, in addition to the plate 26, the mold 10 comprises an elongated sheet metal frame 28, means for mounting the frame 28 across the open end of the mold 12, and means 32 for biasing the plate 26 for movement longitudinally into the mold 12. The frame 28 is formed with lengthwise parallel flanged portions 34. The mounting means 30 comprises a pair of depending catchplates 36 hinged between the flanged portions 34 of the frame 28 at opposite ends of the frame 28 by means of hinge pins 38. The respective catchplates 36 are formed with transversely matching flanges 40 each comprising a series of spaced ratchet teeth 42 adapted to engage the flange 24 of the mold 12. Preferably, the biasing means 32 comprises a helical spring 44 or other resilient means disposed between the frame 28 and the plate 26. As shown, the upper end 46 of the helical spring 44 engages a washer 48 welded or otherwise suitably attached to the flanged portions 34 of the frame 28, and the lower end 50 of the helical spring 44 engages a washer 52 welded or otherwise suitably attached to the plate 26. Suitable raised embossing on one face of the washer 48 and similar embossing (not shown) on one face of the washer 52 serve to align the opposite ends of the helical spring 44. The teeth 42 on the flanges 40 of the catchplates 36 are shaped to cooperate with the flange 24 of the mold 12, and thus to secure the mold cover 10, so long as the helical spring 44 is compressed by engagement of the plate 26 with the product 14. The amount of compression of the helical spring 44 may be increased by engagement of teeth 42 closer to the hinge pins 38 and decreased by engagement of teeth 42 farther from the hinge pins 38. As shown, the teeth 42 are further shaped to permit the amount of compression of the helical spring 44 to be increased without removal of the plate 26 from the mold 12.

In accordance with the principles of this invention, the mold cover 10 further comprises means 60 for maintaining the plate 26 in predetermined transverse relation to the sides 20 of the mold 12.

In FIGS. 1 through 3, the means 60 for maintaining the plate 26 in predetermined transverse relation to the sides 20 of the mold 12 comprises an elongated bar 62 welded or otherwise rigidly mounted to the plate 26, the frame 28 being adapted to guide the bar 62 for movement longitudinally of the mold 12 together with the plate 26. As shown, the bar 62 passes freely through the helical spring 44 and slidably fits through a suitably shaped opening 64 in the washer 48 and also through an aligned similarly shaped opening (not shown) in the frame 28. The washer 48 serves to maintain the bar 62 in parallel relation to the sides of the mold 12. Accidental disassociation of the bar 62 and the frame 28 is prevented by means of a knockout pin 66 fitted through a suitably shaped opening 68 in the bar 62 beyond the frame 28.

Preferably, as shown, the plate 26 is shaped to fit in closely spaced relation to the sides 20 of the mold 12. Because the bar 62 cannot pivot, either with respect to the frame 28 or with respect to the washer 48, scoring of the sides 20 of the mold 12 by edges of the plate 26 is prevented. Also, as in the example shown, if the mold 12 is other than circular in cross section, the bar 62 and the aligned openings may be noncircular in cross section to prevent rotation of the bar 62 and the plate 26 with respect to the longitudinal axis of the bar 62, and thus to prevent corners of the plate 26 from scoring the sides 20 of the mold 12. As shown, the bar 62 and the aligned openings are rectangular in cross section.

As shown, the plate 26 is flat with respect to the adjacent end 16 of the product 14. It should be understood that the principles of this invention also may be embodied in a mold cover having a pressure plate that is concave with respect to the adjacent end of the product or otherwise arbitrarily shaped.

In FIG. 4, in which primed reference numerals are used to indicate parts similar to like numbered parts in FIGS. 1 through 3, a dual mold cover 10' is shown in combination with a conventional elongated open-ended dual mold 12'. As shown, each cavity of the mold 12' is nearly totally filled with a meat loaf or other food product 14'. Often, such dual molds are used with filling specially designed filling apparatus such as that described in U.S. Pat. No. 3,371,690. The mold cover 10' has a pair of similar pressure plates 26' adapted to fit transversely within the respective cavities of the mold 12' and biased for movement longitudinally into the respective cavities of the mold 12'. Each plate 26' is movable independently of the other, within the range of compression of the respective helical springs 44', such that it is not necessary that both cavities of the mold 12' be filled to precisely the same level. In other respects, the arrangement of parts in FIG. 4 is similar to the arrangement of parts in FIGS. 1 through 3.

Thus, it will be appreciated that all of the recited objects, advantages and features of this invention have been demonstrated as obtainable in a highly practical apparatus and one that is simple and positive in operation.

It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed:

1. A mold cover for use in combination with an elongated open-ended mold used in molding meat loaves and other food products and comprising an elongated sheet material frame having parallel flanges, means for mounting the frame across the open end of the mold, a washer mounted to the parallel flanges of said frame, said washer having an opening which is aligned with and spaced from an opening in said frame, a plate adapted to fit transversely within the cavity of said mold for movement longitudinally into said mold, and an elongated bar rigidly mounted to said plate, said bar being rectangular in cross-section and slidably fitted through and guided by the openings in said frame and said washer to maintain said bar in parallel relation to the sides of said mold during movement together with said plate longitudinally of said mold, spring means surrounding said bar and being positioned between said washer and said plate to maintain said plate in pressure engagement with said meat loaves or other food products being molded in said mold, at least one of said openings being shaped to prevent rotation of said bar with respect to a longitudinal axis of said bar.

2. The mold cover of claim 1 wherein both of said opening are rectangular.

* * * * *